(12) United States Patent
Yao et al.

(10) Patent No.: US 12,473,223 B1
(45) Date of Patent: Nov. 18, 2025

(54) INTELLIGENT WASTEWATER PURIFICATION AND TREATMENT DEVICE

(71) Applicant: Zhejiang Institute of Hydraulics & Estuary (Zhejiang Institute of Marine Planning and Design), Hangzhou (CN)

(72) Inventors: Shuiping Yao, Hangzhou (CN); Helong Wang, Hangzhou (CN); Yimin Qian, Hangzhou (CN); Ruoying He, Hangzhou (CN); Junhong Xiang, Hangzhou (CN)

(73) Assignee: Zhejiang Institute of Hydraulics & Estuary (Zhejiang Institute of Marine Planning and Design), Hangzhou (CN)

( * ) Notice: Subject to any disclaimer, the term of this patent is extended or adjusted under 35 U.S.C. 154(b) by 0 days.

(21) Appl. No.: 19/229,043

(22) Filed: Jun. 5, 2025

(30) Foreign Application Priority Data

Mar. 6, 2025 (CN) .......................... 202510262360.7

(51) Int. Cl.
*C02F 9/00* (2023.01)
*C02F 1/00* (2023.01)
*C02F 1/36* (2023.01)
*C02F 1/52* (2023.01)
*C02F 103/32* (2006.01)

(52) U.S. Cl.
CPC ................ *C02F 9/00* (2013.01); *C02F 1/001* (2013.01); *C02F 1/36* (2013.01); *C02F 1/52* (2013.01); *C02F 2103/32* (2013.01); *C02F 2201/004* (2013.01); *C02F 2209/00* (2013.01)

(58) Field of Classification Search
None
See application file for complete search history.

*Primary Examiner* — Peter Keyworth
(74) *Attorney, Agent, or Firm* — Rondaus PLLC; George Liu

(57) ABSTRACT

Disclosed herein is an intelligent wastewater purification and treatment device. The device comprises a drum, a plurality of protrusions arranged in an array are fixed to an inner surface of the drum, an oil scraping assembly is arranged in the drum, mixed oil adhering to the inner surface of the drum is scraped away by the oil scraping assembly, a bottom of the oil scraping assembly is provided with an oil conveying assembly, and the scraped mixed oil is discharged from the drum via the oil conveying assembly. One side of the oil conveying assembly is provided with a separation assembly, the separation assembly comprises a refrigeration tank and a separation portion, an oil outlet of the oil conveying assembly is fixedly communicated with the refrigeration tank via a discharge pipe, and the mixed oil entering the refrigeration tank is separated by the separation portion.

8 Claims, 8 Drawing Sheets

INTELLIGENT WASTEWATER PURIFICATION AND TREATMENT DEVICE

CROSS-REFERENCE TO RELATED APPLICATIONS

This application claims priority to Chinese Patent Application No. 202510262360.7, filed on Mar. 6, 2025, which is incorporated herein by reference in its entirety.

TECHNICAL FIELD

The present disclosure relates to the technical field of wastewater treatment, in particular to an intelligent wastewater purification and treatment device.

BACKGROUND

With the rapid economic development in China, the catering and tourism industries have expanded significantly, leading to severe pollution from kitchen wastewater discharged by hotels, restaurants, and other catering establishments. The increasing volume of such wastewater has worsened pollution problems. Kitchen wastewater contains high concentrations of animal and vegetable oils, along with substantial suspended solid matter, making it a major pollution source. Due to significant fluctuations in wastewater quality, conventional biological treatment methods fail to consistently ensure compliance with discharge standards under poor water quality conditions.

Chinese Patent Application Publication No. CN108483779A discloses a kitchen wastewater treatment device comprising a housing located below a sink, wherein an inclined filter screen is slidably connected within the housing. Telescopic springs are fixedly connected between two ends of the filter screen and a top wall of the housing, and a drive switch is provided on a side wall of the housing. This design addresses issues of grease-induced pipe clogging and manual collection inefficiencies in traditional wastewater treatment devices.

Another example, Chinese Patent Application Publication No. CN107555676A, discloses a kitchen wastewater treatment device in the field of wastewater treatment. It addresses issues including frequent clogging of filter screens during solid-liquid separation via filter screens, which causes filter system failures, and inadequate oil removal efficiency in existing devices.

However, for large-scale catering operations, the prior art and existing kitchen wastewater treatment devices still demonstrate specific drawbacks in practical applications. For instance:

Due to the high concentrations of vegetable oil and fat oil in kitchen wastewater, the prior art fails to efficiently separate these oils respectively, thereby preventing wastewater purification for reuse as reclaimed water resources. Furthermore, the collected oils can be reprocessed into secondary products, thereby reducing resource waste.

Furthermore, the prior art fails to implement intelligent detection during the purification of kitchen wastewater, leading to cumbersome operation, low automation levels, and suboptimal treatment results.

SUMMARY

The objective of the present disclosure is to provide an intelligent wastewater treatment and reclaimed water resource utilization device to solve the problems raised in the above background.

To achieve the foregoing objective, the present disclosure provides the following technical solutions: An intelligent wastewater treatment and reclaimed water resource utilization device, comprising a drum, wherein two sides of the drum are each provided with a connecting member, the drum is rotatably connected between the two connecting members and driven by a drive member to rotate, a top of the drum is provided with a refrigeration member, the refrigeration member comprises an arc-shaped plate and a plurality of cooling tubes fixed to an inner surface of a top of the arc-shaped plate, the drum is movably arranged at a bottom of the arc-shaped plate, and a drum body at the top of the drum is cooled by the refrigeration member;

a plurality of protrusions arranged in an array are fixed to an inner surface of the drum, an oil scraping assembly is arranged in the drum, mixed oil adhering to the inner surface of the drum is scraped away by the oil scraping assembly, a bottom of the oil scraping assembly is provided with an oil conveying assembly, and the scraped mixed oil is discharged from the drum via the oil conveying assembly;

one side of the oil conveying assembly is provided with a separation assembly, the separation assembly comprises a refrigeration tank and a separation portion, an oil outlet of the oil conveying assembly is fixedly communicated with the refrigeration tank via a discharge pipe, and the mixed oil entering the refrigeration tank is separated by the separation portion;

a wastewater inlet pipe and a fourth connecting pipe are respectively arranged on two sides of the drum, the wastewater inlet pipe is communicated with the fourth connecting pipe, and the fourth connecting pipe is sequentially connected with a fourth liquid pump, a second water quality detector and a fourth solenoid valve along an extension direction toward the wastewater inlet pipe; and a first connecting pipe is fixedly connected to a pipe body of the fourth connecting pipe, the first connecting pipe is sequentially connected with a first solenoid valve and a first liquid pump along an extension direction of the first connecting pipe, an output side of the first connecting pipe is connected to a secondary purification device, and water discharged from the first connecting pipe is further purified by the secondary purification device.

Further, each of the two connecting members comprises a bearing, two ends of the drum are respectively fixed to an inner ring of each of the two bearings, a supporting block is fixed to an outer ring of each of the bearings, and a supporting leg is fixed to a bottom of the supporting block.

Further, the oil scraping assembly comprises a movable plate, a scraper is fixed to a top of the movable plate and inclined toward a right side, and a top end face of the scraper is in contact with the inner surface of the drum; and a horizontal extension plate is fixed to a side face of the movable plate, a bottom of the horizontal extension plate is provided with a horizontal fixed plate, a plurality of insertion rods are fixed to a top end of the horizontal fixed plate, each of the insertion rods is movably inserted into the horizontal extension plate, and a plurality of springs are fixed between the horizontal extension plate and the horizontal fixed plate.

Further, the oil conveying assembly comprises a rotating shaft, an arc-shaped enclosure and a closed enclosure, the arc-shaped enclosure is fixed to a bottom of the scraper, and the arc-shaped enclosure forms an oil inlet on a side facing the scraper; and a conveying spiral plate is fixed to a shaft body of the rotating shaft, a first motor is fixed to a side face of the closed enclosure, and an output end of the first motor is fixed to an end portion of the rotating shaft.

Further, a partition plate is fixed at a bottom of the refrigeration tank, and the partition plate divides the refrigeration tank into a fat oil separation chamber and a vegetable oil separation chamber;

the separation portion comprises an inclined plate, the discharge pipe is located at a top of the inclined plate, and the mixed oil to be separated falls onto the top of the inclined plate via the discharge pipe and slides downward along the inclined plate;

a tension shaft and at least two horizontally distributed rollers are movably connected between side walls of the refrigeration tank, the tension shaft is located at a bottom of each of the rollers, and an oil-absorbing belt is arranged between the tension shaft and each of the rollers;

a pressing roller is further fixed between the side walls of the refrigeration tank, the pressing roller is located directly below the tension shaft, and the pressing roller is pressed against the oil-absorbing belt;

an output side of the oil-absorbing belt is located directly above the fat oil separation chamber, and the pressing roller and the tension shaft are located directly above the vegetable oil separation chamber; and an outer side of the refrigeration tank is provided with a drive member, and the drive member drives the oil-absorbing belt to move.

Further, a transverse shaft is fixed between the side walls of the refrigeration tank, the top of the inclined plate is movably connected with the transverse shaft, a movable shaft is movably connected between the side walls of the refrigeration tank, a cam is fixed to a shaft body of the movable shaft, and an outer surface of the cam is in contact with a bottom of the inclined plate.

Further, fixed pulleys are fixed to shaft bodies of the movable shaft and the rollers that extend out of the refrigeration tank, a belt is connected between the fixed pulleys, a supporting frame is fixed to the side wall of the refrigeration tank, a second motor is fixed to a side face of the supporting frame, and an output end of the second motor is fixed to an end portion of the movable shaft or one of the rollers.

Further, the secondary purification device comprises an ultrasonic cavitation assembly, a flocculation assembly and a filtration assembly;

a second connecting pipe is fixedly communicated between the ultrasonic cavitation assembly and the flocculation assembly, a second liquid pump, a first water quality detector and a second solenoid valve are respectively connected to a pipe body of the second connecting pipe, a return pipe is connected to the pipe body of the second connecting pipe located at a bottom of the second solenoid valve, and a third solenoid valve is connected to a pipe body of the return pipe; and a third connecting pipe is fixedly communicated between the flocculation assembly and the filtration assembly, and a third liquid pump is connected to a pipe body of the third connecting pipe.

Further, the device further comprises an intelligent control system, and the intelligent control system is electrically connected to the fourth liquid pump, the second water quality detector, the fourth solenoid valve, the first solenoid valve, the first liquid pump, the second liquid pump, the first water quality detector, the second solenoid valve, the third solenoid valve and the third liquid pump.

Compared with the prior art, the beneficial effects of the present disclosure are:

The intelligent wastewater treatment and reclaimed water resource utilization device is provided with a drum, an oil scraping assembly, an oil conveying assembly, and a separation assembly. During rotation of the drum, the oil scraping assembly and the oil conveying assembly separate vegetable oil and fat oil from water in the kitchen wastewater contained within the drum. The separated oils are subsequently isolated individually via the separation assembly. While purifying the kitchen wastewater, the collected vegetable oil and fat oil can be reprocessed into secondary products, thereby reducing resource waste.

Furthermore, the device is provided with an intelligent control system. During purification, the control system monitors oil content in the wastewater and performs real-time detection of de-oiled water after cavitation treatment. This configuration enhances automation levels and wastewater treatment efficiency. The system is programmed to discharge treated water once it meets relevant discharge standards, whereas non-compliant water is continuously recycled for additional treatment cycles. This achieves fully automated control of the wastewater treatment process and improves treatment efficacy.

Figure 1:
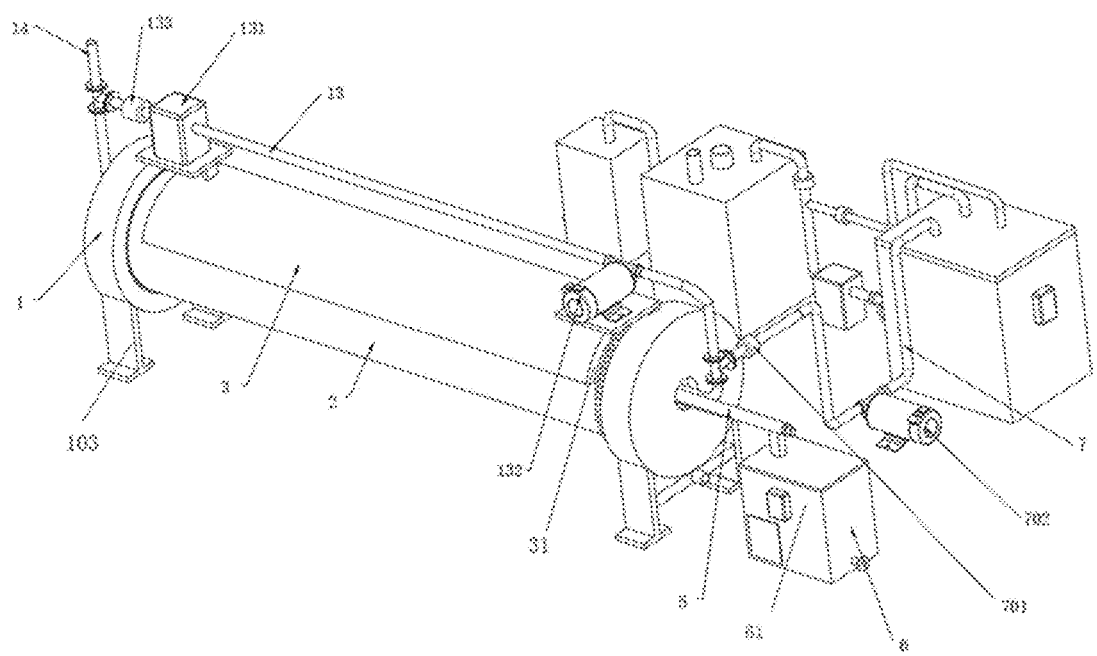
FIG. 1 is a left-side axonometric view of the present disclosure.

Reference Numerals in the Figures: 1, connecting member; 101, bearing; 102, supporting block; 2, drum; 201, protrusion; 3, refrigeration member; 4, oil scraping assembly; 401, movable plate; 402, scraper; 403, horizontal extension plate; 404, horizontal fixed plate; 405, insertion rod; 5, oil conveying assembly; 501, arc-shaped enclosure; 502, closed enclosure; 503, conveying spiral plate; 504, first motor; 505, discharge pipe; 6, separation assembly; 601, partition plate; 602, transverse shaft; 603, inclined plate; 604, roller; 605, tension shaft; 606, pressing roller; 607, oil-absorbing belt; 608, cam; 609, fixed pulley; 610, supporting frame; 611, second motor; 612, belt; 7, first connecting pipe; 701, first solenoid valve; 702, first liquid pump; 8, ultrasonic cavitation assembly; 801, second connecting pipe; 802, second liquid pump; 803, first water quality detector; 9, second solenoid valve; 10, third solenoid valve; 11, flocculation assembly; 111, third connecting pipe; 112, third liquid pump; 12, filtration assembly; 13, fourth connecting pipe; 131, second water quality detector; 132, fourth liquid pump; 133, fourth solenoid valve; 14, wastewater inlet pipe.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative efforts fall within the scope of protection of the present disclosure.

Figure 2:
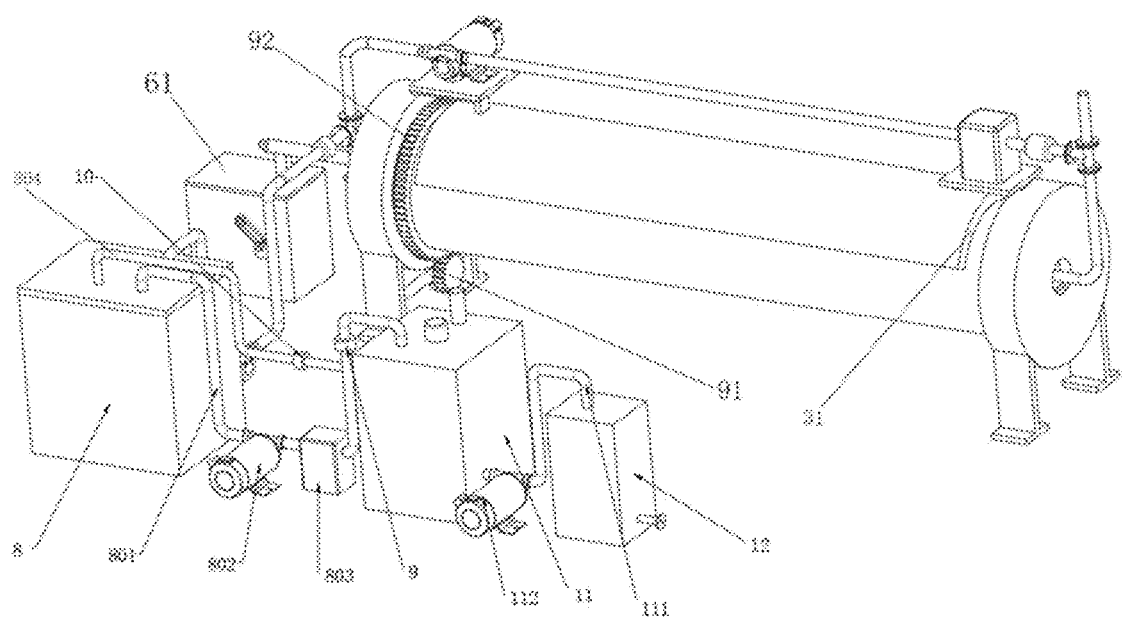
FIG. 2 is a right-rear axonometric view of the present disclosure.
Figure 3:
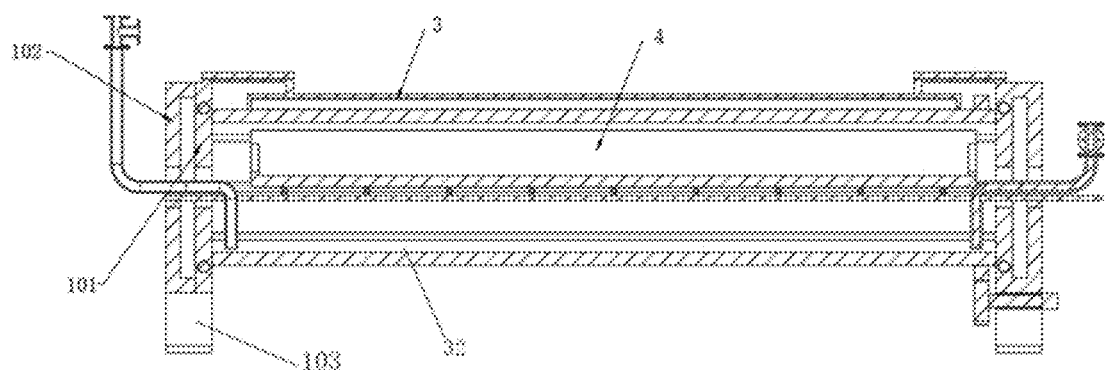
FIG. 3 is a semi-sectional view of a drum of the present disclosure.

As shown in FIGS. 1-8, the present disclosure provides a technical solution: An intelligent wastewater treatment and reclaimed water resource utilization device, comprising a drum 2 made of a stainless steel material, wherein two sides of the drum 2 are each provided with a connecting member 1, and the drum 2 is rotatably connected between the two connecting members 1. As illustrated in FIG. 3, each of the two connecting members 1 comprises a bearing 101, two ends of the drum 2 are respectively fixed to an inner ring of each of the two bearings 101, a supporting block 102 is fixed to an outer ring of each of the bearings 101, and a supporting leg 103 is fixed to a bottom of the supporting block 102. The supporting leg 103 is secured to the ground. The drum 2 is driven to rotate by a drive member. The drive member comprises a first gear 91 and a second gear 92 fixed to one side of the drum 2. The first gear 91 meshes with the second gear 92. A drive motor on the drive member drives the first gear 91 to rotate, thereby causing the second gear 92 and the drum 2 to rotate accordingly. Notably, two ends of the drum 2 are fixed to the inner rings of the bearings 101, ensuring a sealed state at two sides of the drum 2 to prevent wastewater overflow during rotation.

As shown in FIGS. 1 and 3, a top of the drum 2 is provided with a refrigeration member 3. The refrigeration member 3 comprises an arc-shaped plate 31 and a plurality of cooling tubes 32 fixed to an inner surface of a top portion of the arc-shaped plate 31. The cooling tubes 32 are connected to an external cooling machine. The drum 2 is movably arranged at a bottom of the arc-shaped plate 31, forming a relatively sealed space between the drum surface and the arc-shaped plate 31. The cooling tubes 32 maintain this space at a temperature range of $-5°$ C. to $3°$ C., thereby cooling the top portion of the drum 2 through the refrigeration member 3.

Figure 4:
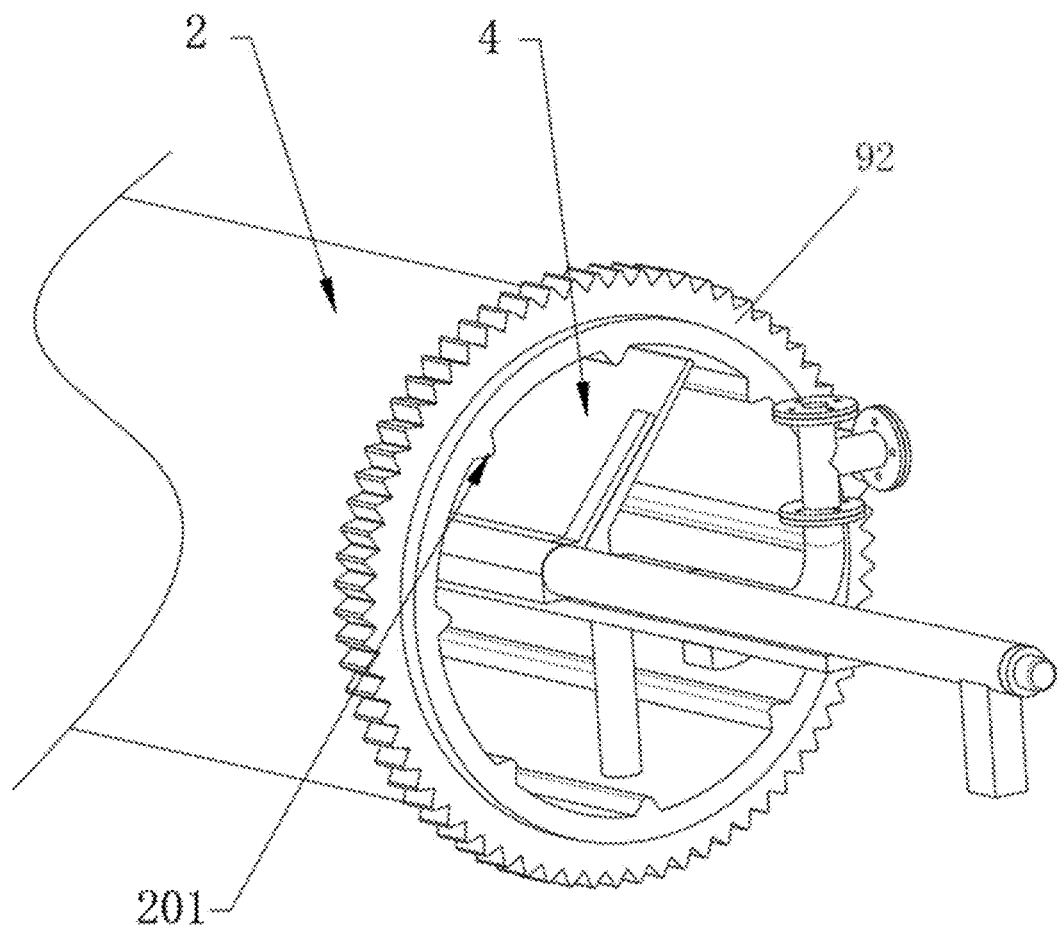
FIG. 4 is an axonometric view of a drum of the present disclosure.
Figure 5:
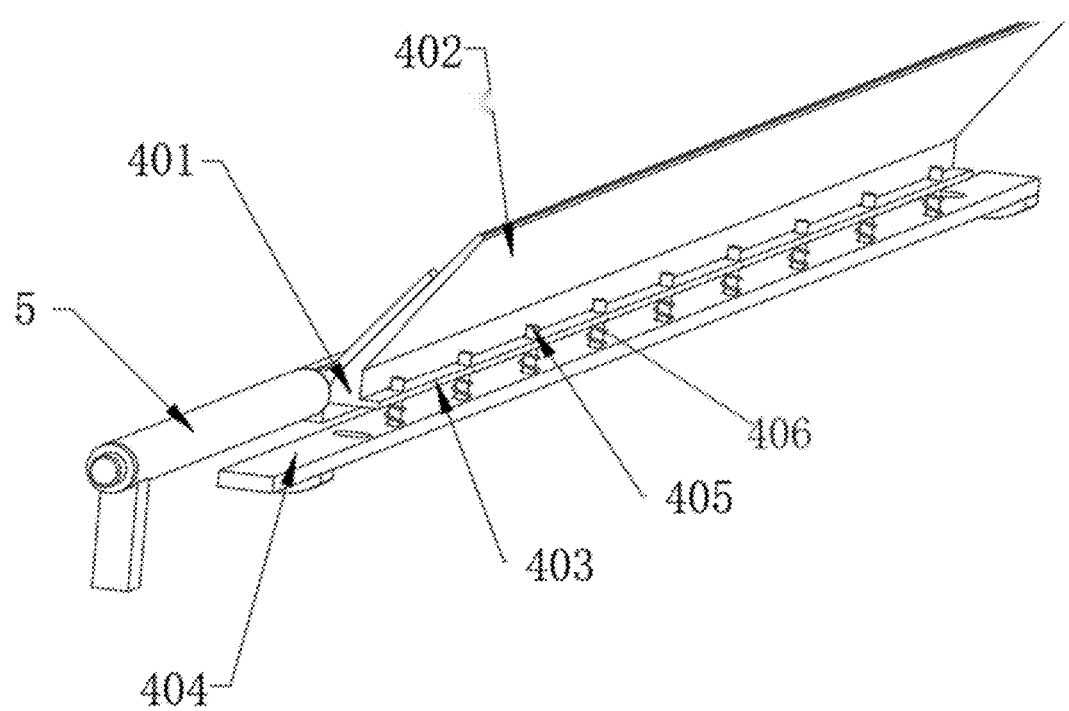
FIG. 5 is a detailed view of an oil scraping assembly of the present disclosure.
Figure 6:
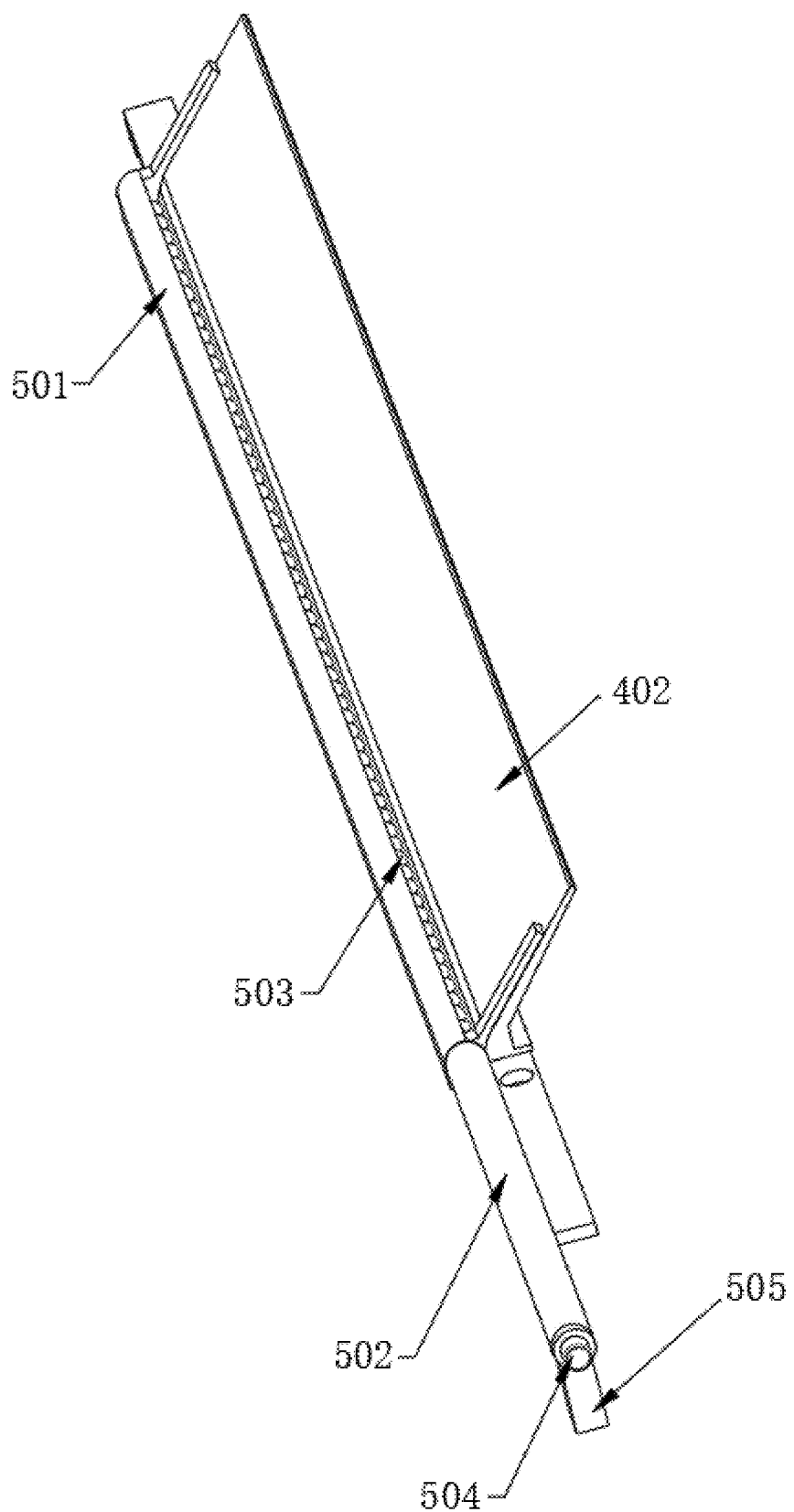
FIG. 6 is a top view of an oil scraping assembly of the present disclosure.

As shown in FIG. 4, a plurality of protrusions 201 arranged in an array are fixed to an inner surface of the drum 2. The angle formed between two side surfaces of each of the protrusions 201 is 60-120°. An oil scraping assembly 4 is arranged in the drum 2, mixed oil adhering to the inner surface of the drum 2 is scraped away by the oil scraping assembly 4, a bottom of the oil scraping assembly 4 is provided with an oil conveying assembly 5, and the scraped mixed oil is discharged from the drum 2 via the oil conveying assembly 5. Specifically, as shown in FIGS. 4-6, the oil scraping assembly 4 comprises a movable plate 401, a scraper 402 is fixed to a top of the movable plate 401 and inclined toward a right side, and a top end face of the scraper 402 is in contact with the inner surface of the drum 2. A horizontal extension plate 403 is fixed to a side face of the movable plate 401, and a bottom of the horizontal extension plate 403 is provided with a horizontal fixed plate 404. Both the horizontal extension plate 403 and the horizontal fixed plate 404 are parallel to the ground. The horizontal fixed plate 404 is fixed to inner wall holes of the supporting blocks 102 via extension blocks on both sides, thereby ensuring no interference with the rotation of the drum 2. A plurality of insertion rods 405 are fixed to a top end of the horizontal fixed plate 404, each of the insertion rods 405 is movably inserted into the horizontal extension plate 403, a plurality of springs 406 are fixed between the horizontal extension plate 403 and the horizontal fixed plate 404, and the insertion rods 405 are located in the coils of the springs 406.

As shown in FIGS. 4-6, the oil conveying assembly 5 comprises a rotating shaft, an arc-shaped enclosure 501 and a closed enclosure 502, wherein the arc-shaped enclosure 501 is fixed to a bottom of the scraper 402, and the arc-shaped enclosure 501 forms an oil inlet on a side facing the scraper 402. Scraped oil slides along the scraper 402 and enters the arc-shaped enclosure 501 through the oil inlet. A conveying spiral plate 503 is fixed to a shaft body of the rotating shaft, a first motor 504 is fixed to a side face of the closed enclosure 502, and an output end of the first motor 504 is fixed to an end portion of the rotating shaft.

It should be understood that the purpose of providing the protrusions 201 is:
1. At low temperatures, molecular motion in oil slows, and intermolecular forces strengthen, leading to reduced fluidity and consequently increased viscosity. When oil adheres to the inner surface of the drum 2 during its rotation, oil droplets aggregate. Under gravity, some oil may flow back into the wastewater along the inner surface of the drum 2. The provided protrusions 201 not only increase the contact area between the inner surface of the drum 2 and the wastewater to enhance oil collection efficiency but also prolong the travel paths of oil droplets, thereby preventing oil from re-entering the wastewater.
2. During rotation of the drum 2, the scraper 402 scrapes oil adhering to the inner surface of the drum 2. When the protrusions 201 contact the top of the scraper 402, the protrusions 201 exert compressive force on the scraper 402, causing the springs to contract and the horizontal extension plate 403 to move downward. Due to the high rotational speed of the drum 2, the scraper 402 undergoes vertical reciprocating motion, generating vibrations that dislodge solidified fat oil adhering to the surface of the scraper 402. This configuration not only reduces the frequency of cleaning the scraper 402 but also ensures the continuity of wastewater treatment.

Figure 7:
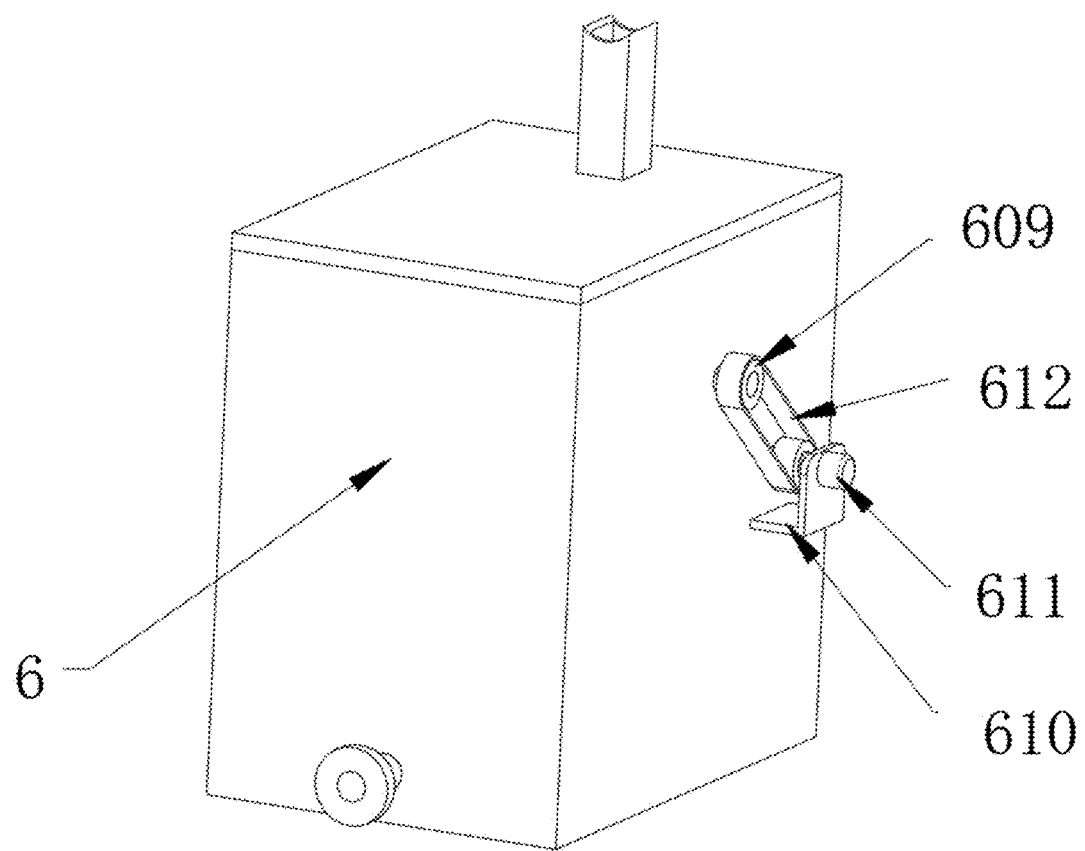
FIG. 7 is an axonometric view of a separation assembly of the present disclosure.
Figure 8:
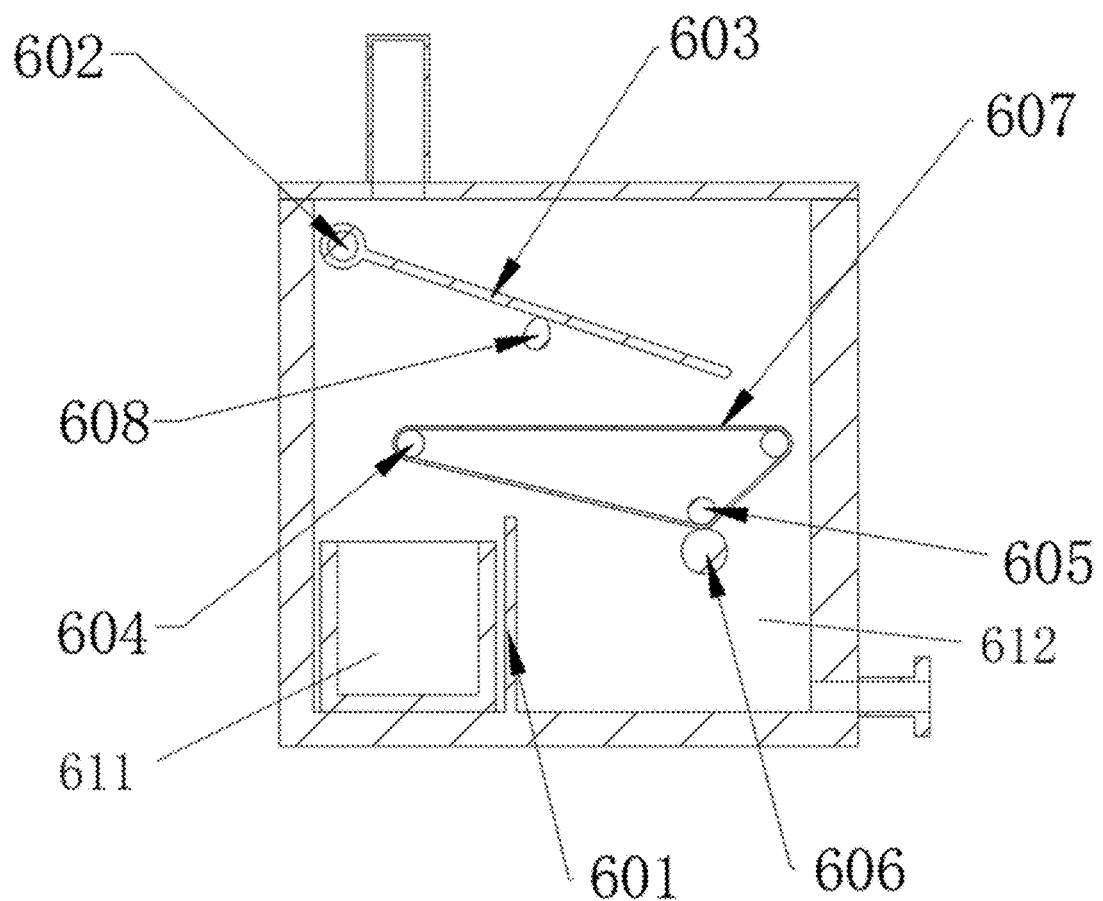
FIG. 8 is a semi-sectional view of a separation assembly of the present disclosure.

As shown in FIGS. 1, 7, and 8, one side of the oil conveying assembly 5 is provided with a separation assembly 6, wherein the separation assembly 6 comprises a refrigeration tank 61 and a separation portion. The refrigeration tank 61 is maintained at a temperature of $-3°$ C. to $3°$ C. by a refrigeration unit. An oil outlet of the oil conveying assembly 5 is fixedly communicated with the refrigeration tank 61 via a discharge pipe 505, and the mixed oil entering the refrigeration tank 61 is separated by the separation portion. A wastewater inlet pipe 14 and a fourth connecting pipe 13 are respectively arranged on two sides of the drum 2. Filtered kitchen wastewater enters the bottom of the drum 2 through the wastewater inlet pipe 14. Notably, this solution utilizes the temporal characteristics of catering operations for kitchen wastewater treatment: when kitchen wastewater enters the bottom of the drum 2 via the wastewater inlet pipe 14, the drum 2 remains stationary and only stores the wastewater. The treatment device starts operating after work, such as at night or during midday breaks.

As shown in FIG. 8, a partition plate 601 is fixed at a bottom of the refrigeration tank 61, and the partition plate 601 divides the refrigeration tank 61 into a fat oil separation chamber 611 and a vegetable oil separation chamber 612. The separation portion comprises an inclined plate 603, the discharge pipe 505 is located at a top of the inclined plate 603, and the mixed oil to be separated falls onto the top of the inclined plate 603 via the discharge pipe 505 and slides downward along the inclined plate 603. A tension shaft 605 and at least two horizontally distributed rollers 604 are movably connected between side walls of the refrigeration tank 61, the tension shaft 605 is located at a bottom of each of the rollers 604, and an oil-absorbing belt 607 is arranged between the tension shaft 605 and each of the rollers 604. A pressing roller 606 is further fixed between the side walls of the refrigeration tank 61, the pressing roller 606 is located directly below the tension shaft 605, and the pressing roller 606 is pressed against the oil-absorbing belt 607. In this solution, an output side of the oil-absorbing belt 607 is located directly above the fat oil separation chamber 611, and the pressing roller 606 and the tension shaft 605 are located directly above the vegetable oil separation chamber 612. An outer side of the refrigeration tank 61 is provided with a drive member, and the drive member drives the oil-absorbing belt 607 to move.

To prevent solidified vegetable oil from accumulating on the top of the inclined plate 603 and reducing separation efficiency, in a specific embodiment of this solution, a transverse shaft 602 is fixed between the side walls of the refrigeration tank 61, the top of the inclined plate 603 is movably connected with the transverse shaft 602, a movable shaft is movably connected between the side walls of the refrigeration tank 61, a cam 608 is fixed to a shaft body of the movable shaft, and an outer surface of the cam 608 is in contact with a bottom of the inclined plate 603. Fixed pulleys 609 are fixed to shaft bodies of the movable shaft and the rollers 604 that extend out of the refrigeration tank 61, a belt 612 is connected between the fixed pulleys 609, a supporting frame 610 is fixed to the side wall of the refrigeration tank 61, a second motor 611 is fixed to a side face of the supporting frame 610, and an output end of the second motor 611 is fixed to an end portion of the movable shaft or one of the rollers 604.

To ensure purification quality, as shown in FIG. 1, the wastewater inlet pipe 14 is communicated with the fourth connecting pipe 13, and the fourth connecting pipe 13 is sequentially connected with a fourth liquid pump 132, a second water quality detector 131 and a fourth solenoid valve 133 along an extension direction toward the wastewater inlet pipe 14. A first connecting pipe 7 is fixedly connected to a pipe body of the fourth connecting pipe 13, the first connecting pipe 7 is sequentially connected with a first solenoid valve 701 and a first liquid pump 702 along an extension direction of the first connecting pipe 7, an output side of the first connecting pipe 7 is connected to a secondary purification device, and water discharged from the first connecting pipe 7 is further purified by the secondary purification device. The purpose of this further purification is to remove protein particles contained in the wastewater.

As shown in FIG. 2, the secondary purification device comprises an ultrasonic cavitation assembly 8, a flocculation assembly 11 and a filtration assembly 12. The ultrasonic cavitation assembly 8 generates shockwaves to induce cavitation effects in wastewater, which are sufficient to break chemical bonds, promote chemical reactions including molecular fragmentation and free radical formation, and thereby degrade and decompose organic matter. The flocculation assembly 11 adds flocculants to coagulate protein ions in the wastewater. Notably, after organic matter is ionized by the ultrasonic cavitation assembly 8, coagulation in the flocculation assembly 11 further enhances purification efficacy. The filtration assembly 12 filters the coagulated water, which is then reclaimed for secondary use as domestic water. The ultrasonic cavitation assembly 8, the flocculation assembly 11, and the filtration assembly 12 are prior art and will not be elaborated in this solution.

A second connecting pipe 801 is fixedly communicated between the ultrasonic cavitation assembly 8 and the flocculation assembly 11, a second liquid pump 802, a first water quality detector 803 and a second solenoid valve 9 are respectively connected to a pipe body of the second connecting pipe 801, a return pipe 804 is connected to the pipe body of the second connecting pipe 801 located at a bottom of the second solenoid valve 9, and a third solenoid valve 10 is connected to a pipe body of the return pipe 804. A third connecting pipe 111 is fixedly communicated between the flocculation assembly 11 and the filtration assembly 12, and a third liquid pump 112 is connected to a pipe body of the third connecting pipe 111.

Additionally, the device in the present disclosure further comprises an intelligent control system, wherein the intelligent control system is electrically connected to the fourth liquid pump 132, the second water quality detector 131, the fourth solenoid valve 133, the first solenoid valve 701, the first liquid pump 702, the second liquid pump 802, the first water quality detector 803, the second solenoid valve 9, the third solenoid valve 10 and the third liquid pump 112.

Supplementary Operation Details for This Solution: Filtered kitchen wastewater enters the bottom of the drum 2 through the wastewater inlet pipe 14. The single inflow volume is limited to ⅓ of the drum's capacity to prevent leakage through the holes in the bearing 101 and the supporting block 102. When drainage is inactive, the control system activates the refrigeration member 3 and drives the drum 2 to rotate via the drive member. Vegetable oil and fat oil float atop the kitchen wastewater. As the drum 2 rotates, these oils and water form a film adhering to the inner surface of the drum 2. When the film rotates to the bottom of the refrigeration member 3, the low temperature at the top of the drum 2 reduces the fluidity and increases the viscosity of the oils. Water flows back into the wastewater along the surface of the drum 2, while the oils continue rotating. As the drum 2 keeps rotating and the temperature of the oils further decreases, fat oil solidifies. Vegetable oil, with reduced fluidity and increased viscosity, continues rotating with the drum 2. Part of the aggregated vegetable oil, due to increased weight, detaches from the protrusions 201 under gravity and falls onto the top of the scraper 402. As the drum 2 rotates, the scraper 402 scrapes oil adhering to the inner surface of the drum 2. When the protrusions 201 contact the top of the scraper 402, the protrusions 201 exert compressive force on the scraper 402, causing the springs 406 to contract and the horizontal extension plate 403 to move downward. Due to the high rotational speed of the drum 2, the scraper 402 undergoes vertical reciprocating motion, generating vibrations that dislodge solidified fat oil adhering to the surface of the scraper 402. Both solidified fat oil and liquid vegetable oil are conveyed by the oil conveying assembly 5 into the refrigeration tank 61. In the refrigeration tank 61, part of the fat oil undergoes further solidification (preventing melting during conveyance by the oil conveying assembly 5), slides down the inclined plate 603, and falls onto the top of the oil-absorbent belt 607. Vegetable oil is adsorbed by the oil-absorbent belt 607. As the oil-absorbent belt 607 moves, solidified fat oil drops into a collection frame in the fat oil separation chamber 611, while the vegetable oil adsorbed on the oil-absorbent belt 607 is squeezed off by the pressing roller 606 and enters the vegetable oil separation chamber 612 for collection.

Simultaneously, the control system closes the first solenoid valve 701 and opens the fourth solenoid valve 133. The fourth liquid pump 132 pumps kitchen wastewater from the drum 2 into the fourth connecting pipe 13. The second water quality detector 131 monitors the oil content in the wastewater in real time, achieving real-time detection of the kitchen wastewater within the drum 2. When the oil index of the kitchen wastewater meets the standard, the control system closes the fourth solenoid valve 133 and opens the first solenoid valve 701. The first liquid pump 702 pumps the de-oiled water to the ultrasonic cavitation assembly 8 for cavitation treatment. Following the same principle, when the first water quality detector 803 detects that the protein index is compliant, the second liquid pump 802 and third liquid pump 112 transfer the de-oiled, cavitated, and flocculated water to the filtration assembly 12 for filtration. The filtered water is reclaimed for domestic use. Similarly, the separated vegetable oil and fat oil are reprocessed into secondary products.

Although embodiments of the present disclosure have been illustrated and described, it will be understood by those of ordinary skill in the art that various modifications, adjustments, substitutions, and alterations may be made to these embodiments without departing from the principles and spirit of the present disclosure. The scope of the present disclosure is defined by the appended embodiments and their legal equivalents.

What is claimed is:

1. An intelligent wastewater treatment and reclaimed water resource utilization device, comprising a drum (2), wherein two sides of the drum (2) are each provided with a connecting member (1), the drum (2) is rotatably connected between the two connecting members (1) and driven by a drive member to rotate, a top of the drum (2) is provided with a refrigeration member (3), the refrigeration member (3) comprises an arc-shaped plate (31) and a plurality of cooling tubes (32) fixed to an inner surface of a top of the arc-shaped plate (31), the drum (2) is movably arranged at a bottom of the arc-shaped plate (31), and a drum body at the top of the drum (2) is cooled by the refrigeration member (3);

a plurality of protrusions (201) arranged in an array are fixed to an inner surface of the drum (2), an oil scraping assembly (4) is arranged in the drum (2), mixed oil adhering to the inner surface of the drum (2) is scraped away by the oil scraping assembly (4), a bottom of the oil scraping assembly (4) is provided with an oil conveying assembly (5), and the scraped mixed oil is discharged from the drum (2) via the oil conveying assembly (5);

one side of the oil conveying assembly (5) is provided with a separation assembly (6), the separation assembly (6) comprises a refrigeration tank (61) and a separation portion, an oil outlet of the oil conveying assembly (5) is fixedly communicated with the refrigeration tank (61) via a discharge pipe (505), and the mixed oil entering the refrigeration tank (61) is separated by the separation portion;

a wastewater inlet pipe (14) and a fourth connecting pipe (13) are respectively arranged on two sides of the drum (2), the wastewater inlet pipe (14) is communicated with the fourth connecting pipe (13), and the fourth connecting pipe (13) is sequentially connected with a fourth liquid pump (132), a second water quality detector (131) and a fourth solenoid valve (133) along an extension direction toward the wastewater inlet pipe (14);

a first connecting pipe (7) is fixedly connected to a pipe body of the fourth connecting pipe (13), the first connecting pipe (7) is sequentially connected with a first solenoid valve (701) and a first liquid pump (702) along an extension direction of the first connecting pipe (7), an output side of the first connecting pipe (7) is connected to a secondary purification device, and water discharged from the first connecting pipe (7) is further purified by the secondary purification device;

a partition plate (601) is fixed at a bottom of the refrigeration tank (61), and the partition plate (601) divides the refrigeration tank (61) into a fat oil separation chamber (611) and a vegetable oil separation chamber (612);

the separation portion comprises an inclined plate (603), the discharge pipe (505) is located at a top of the inclined plate (603), and the mixed oil to be separated falls onto the top of the inclined plate (603) via the discharge pipe (505) and slides downward along the inclined plate (603);

a tension shaft (605) and at least two horizontally distributed rollers (604) are movably connected between side walls of the refrigeration tank (61), the tension shaft (605) is located at a bottom of each of the rollers (604), and an oil-absorbing belt (607) is arranged between the tension shaft (605) and each of the rollers (604);

a pressing roller (606) is further fixed between the side walls of the refrigeration tank (61), the pressing roller (606) is located directly below the tension shaft (605), and the pressing roller (606) is pressed against the oil-absorbing belt (607);

an output side of the oil-absorbing belt (607) is located directly above the fat oil separation chamber (611), and the pressing roller (606) and the tension shaft (605) are located directly above the vegetable oil separation chamber (612); and an outer side of the refrigeration tank (61) is provided with a drive member, and the drive member drives the oil-absorbing belt (607) to move.

2. The intelligent wastewater treatment and reclaimed water resource utilization device according to claim 1, wherein each of the two connecting members (1) comprises a bearing (101), two ends of the drum (2) are respectively fixed to an inner ring of each of the two bearings (101), a supporting block (102) is fixed to an outer ring of each of the bearings (101), and a supporting leg (103) is fixed to a bottom of the supporting block (102).

3. The intelligent wastewater treatment and reclaimed water resource utilization device according to claim 1, wherein the oil scraping assembly (4) comprises a movable plate (401), a scraper (402) is fixed to a top of the movable plate (401) and inclined toward a right side, and a top end face of the scraper (402) is in contact with the inner surface of the drum (2); and a horizontal extension plate (403) is fixed to a side face of the movable plate (401), a bottom of the horizontal extension plate (403) is provided with a horizontal fixed plate (404), a plurality of insertion rods (405) are fixed to a top end of the horizontal fixed plate (404), each of the insertion rods (405) is movably inserted into the horizontal extension plate (403), and a plurality of springs (406) are fixed between the horizontal extension plate (403) and the horizontal fixed plate (404).

4. The intelligent wastewater treatment and reclaimed water resource utilization device according to claim 3, wherein the oil conveying assembly (5) comprises a rotating shaft, an arc-shaped enclosure (501) and a closed enclosure (502), the arc-shaped enclosure (501) is fixed to a bottom of the scraper (402), and the arc-shaped enclosure (501) forms an oil inlet on a side facing the scraper (402); and a conveying spiral plate (503) is fixed to a shaft body of the rotating shaft, a first motor (504) is fixed to a side face of the closed enclosure (502), and an output end of the first motor (504) is fixed to an end portion of the rotating shaft.

5. The intelligent wastewater treatment and reclaimed water resource utilization device according to claim 4, wherein a transverse shaft (602) is fixed between the side walls of the refrigeration tank (61), the top of the inclined plate (603) is movably connected with the transverse shaft (602), a movable shaft is movably connected between the side walls of the refrigeration tank (61), a cam (608) is fixed to a shaft body of the movable shaft, and an outer surface of the cam (608) is in contact with a bottom of the inclined plate (603).

6. The intelligent wastewater treatment and reclaimed water resource utilization device according to claim 5, wherein fixed pulleys (609) are fixed to shaft bodies of the movable shaft and the rollers (604) that extend out of the refrigeration tank (61), a belt (612) is connected between the fixed pulleys (609), a supporting frame (610) is fixed to the side wall of the refrigeration tank (61), a second motor (611) is fixed to a side face of the supporting frame (610), and an output end of the second motor (611) is fixed to an end portion of the movable shaft or one of the rollers (604).

7. The intelligent wastewater treatment and reclaimed water resource utilization device according to claim 1, wherein the secondary purification device comprises an ultrasonic cavitation assembly (8), a flocculation assembly (11) and a filtration assembly (12);

a second connecting pipe (801) is fixedly communicated between the ultrasonic cavitation assembly (8) and the flocculation assembly (11), a second liquid pump (802), a first water quality detector (803) and a second solenoid valve (9) are respectively connected to a pipe body of the second connecting pipe (801), a return pipe (804) is connected to the pipe body of the second connecting pipe (801) located at a bottom of the second solenoid valve (9), and a third solenoid valve (10) is connected to a pipe body of the return pipe (804); and a third connecting pipe (111) is fixedly communicated between the flocculation assembly (11) and the filtration assembly (12), and a third liquid pump (112) is connected to a pipe body of the third connecting pipe (111).

8. The intelligent wastewater treatment and reclaimed water resource utilization device according to claim 7, wherein the device further comprises an intelligent control system, and the intelligent control system is electrically connected to the fourth liquid pump (132), the second water quality detector (131), the fourth solenoid valve (133), the first solenoid valve (701), the first liquid pump (702), the second liquid pump (802), the first water quality detector (803), the second solenoid valve (9), the third solenoid valve (10) and the third liquid pump (112).

\* \* \* \* \*